United States Patent
Lee et al.

(10) Patent No.: US 10,205,144 B2
(45) Date of Patent: Feb. 12, 2019

(54) CASE FOR BATTERY PACK

(71) Applicant: SAMSUNG SDI CO., LTD., Yongin-si, Gyeonggi-do (KR)

(72) Inventors: Jeong-Joo Lee, Yongin-si (KR); Tae-Yong Kim, Yongin-si (KR); Young-Deok Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 604 days.

(21) Appl. No.: 14/613,559

(22) Filed: Feb. 4, 2015

(65) Prior Publication Data
US 2015/0236314 A1    Aug. 20, 2015

(30) Foreign Application Priority Data
Feb. 17, 2014    (KR) .................. 10-2014-0017717

(51) Int. Cl.
*H01M 2/10* (2006.01)
*H01M 10/625* (2014.01)
*H01M 10/6554* (2014.01)

(52) U.S. Cl.
CPC ....... *H01M 2/1077* (2013.01); *H01M 10/625* (2015.04); *H01M 10/6554* (2015.04); *H01M 2220/20* (2013.01)

(58) Field of Classification Search
CPC .................. H01M 2/1094; H01M 10/6554
See application file for complete search history.

(56) References Cited

U.S. PATENT DOCUMENTS

| | | | |
|---|---|---|---|
| 2006/0216583 A1* | 9/2006 | Lee | H01M 10/615 429/120 |
| 2010/0112429 A1* | 5/2010 | Murata | H01M 10/625 429/120 |
| 2011/0200861 A1* | 8/2011 | Lin | H01M 10/625 429/120 |
| 2011/0212355 A1* | 9/2011 | Essinger | H01M 2/1016 429/120 |
| 2012/0009455 A1* | 1/2012 | Yoon | H01M 10/653 429/120 |
| 2012/0087091 A1* | 4/2012 | Nassoiy | H01M 10/5053 361/701 |
| 2012/0115003 A1* | 5/2012 | Park | H01M 2/105 429/120 |
| 2012/0196157 A1 | 8/2012 | Krestel et al. | |

(Continued)

FOREIGN PATENT DOCUMENTS

| | | |
|---|---|---|
| CN | 102576916 A | 7/2012 |
| DE | 10 2012 012663 A1 | 12/2013 |

(Continued)

OTHER PUBLICATIONS

Extended European Search Report for 15155209.8 dated Mar. 18, 2015; Lee, et al.

(Continued)

*Primary Examiner* — Eli S Mekhlin
(74) *Attorney, Agent, or Firm* — Lee & Morse, P.C.

(57) ABSTRACT

A case for a battery pack includes a case member configured to accommodate a plurality of battery cells therein and a heat exchange member on any one surface of the case member, the heat exchange member being integrally formed with the case member.

3 Claims, 2 Drawing Sheets

(56) References Cited

U.S. PATENT DOCUMENTS

2012/0227931 A1    9/2012  Heckenberger et al.
2014/0011059 A1    1/2014  Hashimoto et al.

FOREIGN PATENT DOCUMENTS

JP    WO 2012/133707 A1    7/2014
KR    10-2012-0096133 A    8/2012

OTHER PUBLICATIONS

Office Action issued by the Chinese Patent Office dated May 22, 2018 in the examination of the Chinese Patent Application No. 201510075855.5.

* cited by examiner

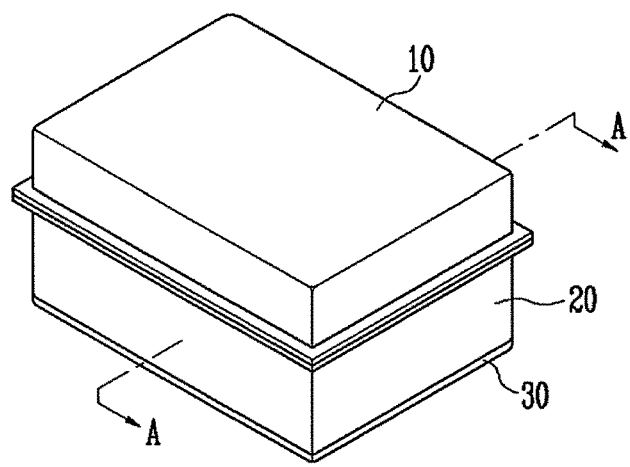
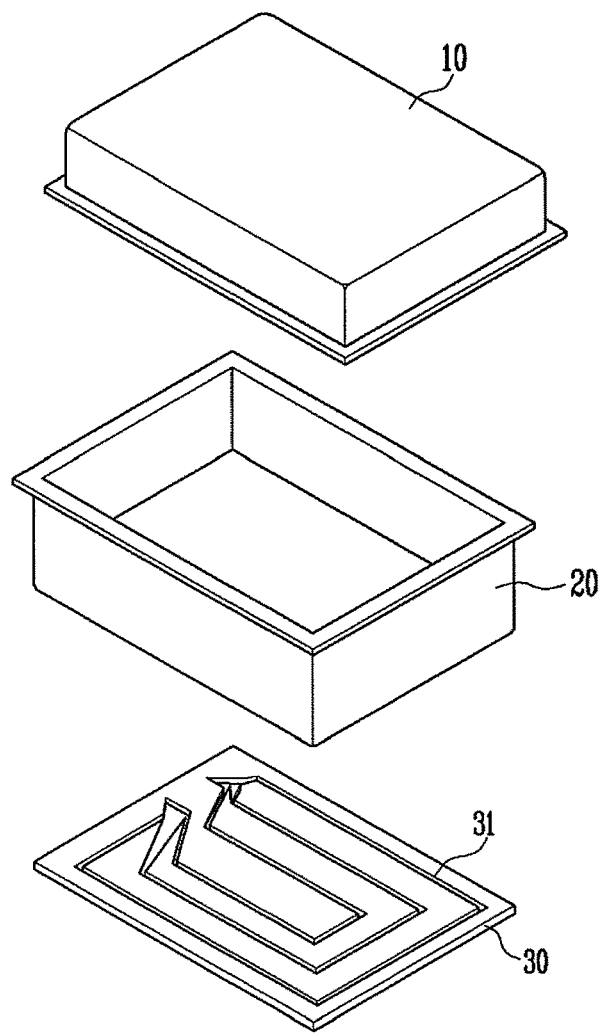

CASE FOR BATTERY PACK

CROSS-REFERENCE TO RELATED APPLICATION

Korean Patent Application No. 10-2014-0017717 filed on Feb. 17, 2014, in the Korean Intellectual Property Office, and entitled: "CASE FOR BATTERY PACK," is incorporated by reference herein in its entirety.

BACKGROUND

1. Field

Embodiments relate to a case for a battery pack.

2. Description of the Related Art

In general, battery cells are used as energy sources for mobile devices, electric vehicles, hybrid vehicles, and the like. The shape of the battery cell may be variously changed depending on the kind of external device to which the battery cell is applied.

In an electric vehicle or hybrid vehicle that consumes a large amount of power in long-time driving and high-power driving, a large-capacity battery module may be configured by electrically connecting a plurality of battery cells in order to increase power and capacity. The output voltage or output current of the battery module may be increased according to the number of battery cells built in the battery module. In addition, a battery pack may be configured by electrically connecting such battery modules.

SUMMARY

Embodiments are directed to a case for a battery pack including a case member configured to accommodate a plurality of battery cells therein, and a heat exchange member on any one surface of the case member, the heat exchange member being integrally formed with the case member.

An upper surface of the heat exchange member may include a flow path through which a cooling medium moves. The upper surface of the heat exchange member may be attached to an outer bottom surface of the case member.

An inner bottom surface of the case member may include a flow path through which a cooling medium moves. The heat exchange member may be attached to the inner bottom surface of the case member.

The heat exchange member may be in a shape of a plate.

A heat shield material may be at a lower portion of the heat exchange member.

The heat exchange member may be welded to the case member through brazing.

The case member and the heat exchange member may be manufactured through die-casting.

BRIEF DESCRIPTION OF THE DRAWINGS

Features will become apparent to those of skill in the art by describing in detail exemplary embodiments with reference to the attached drawings in which:

FIG. 1 illustrates a perspective view showing a case for a battery pack, which includes a heat exchange member according to an embodiment.

FIG. 2 illustrates an exploded perspective view showing the case according to the embodiment.

DETAILED DESCRIPTION

Figure 3:
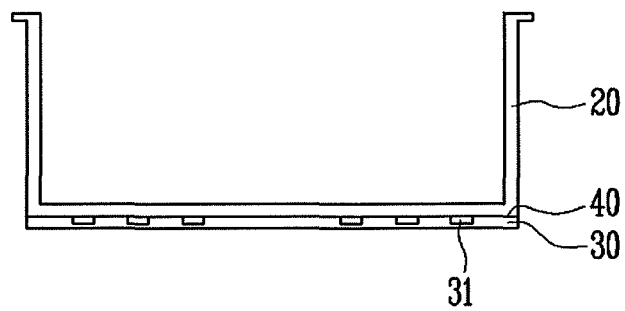
FIG. 3 illustrates a sectional view taken along line A-A' of FIG. 1.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

FIG. 1 illustrates a perspective view showing a case for a battery pack, which includes a heat exchange member according to an embodiment. FIG. 2 illustrates an exploded perspective view showing the case according to the embodiment illustrated in FIG. 1.

Referring to FIGS. 1 and 2, the case according to this embodiment may include a case member that includes upper and lower cases 10 and 20 that accommodate a plurality of battery cells 10 therein and a heat exchange member 30 provided on an outer bottom surface of the lower case 20. A flow path 31 through which a cooling medium moves may be formed in an upper surface the heat exchange member 30. The upper surface of the heat exchange member 30 may be attached to the outer bottom surface of the lower case 20. The lower case 20 and the heat exchange member 30 may be integrally formed.

A heat exchange medium may move through the flow path 31 of the heat exchange member 30. The heat exchange medium may be a refrigerant. The heat exchange medium may include at least one of ethylene glycol and propylene glycol.

Generally, a lower case of a battery pack and a heat exchange member are separately manufactured and then connected to each other, using a bolt, a rivet, or the like. A component such as a bolt, however, is used, and a bolt fastening process is included, thereby increasing manufacturing time and cost.

According to embodiments, a separate cover is not provided to the heat exchange member 30 having the flow path 31 formed therein. Instead, the heat exchange member 30 may be attached directly to the outer bottom surface of the lower case 20, such that it may be possible to omit a component such as a cover, thereby reducing unit cost. The heat exchange member 30 may be welded to the lower case 20 through brazing, and each of the lower case 20 and the heat exchange member 30 may be manufactured through die-casting.

Accordingly, it may be possible to reduce an accumulated assembly tolerance generated in the manufacturing of the case, thereby improving product accuracy. Further, as the contact area between the outer bottom surface of the lower case 20 and the heat exchange member 30 increases, it may be possible to improve the reliability and the stability of the case.

Hereinafter, a battery module will be briefly described.

A battery module may include a plurality of battery cells arranged in one direction. Each battery cell may be provided with a cap plate having a terminal portion formed on an upper surface thereof. In addition, the battery cell may include with a bottom surface provided opposite to the cap plate. A heat exchange member may be provided on the bottom surface of the battery cell.

The battery cell may include a battery cell case of which one surface is opened, and an electrode assembly and an electrolyte, which are accommodated in the battery cell case. The electrode assembly and the electrolyte may generate energy through an electrochemical reaction therebetween, and the battery cell case may be sealed with the cap plate. The cap plate may be provided with the terminal portion and a vent portion. The terminal portion may include positive and negative electrode terminals having different polarities from each other. The vent portion may be a safety device of the battery cell, and may act as a passage through which gas generated inside the battery cell is exhausted to an outside of the battery cell. Positive and negative electrode terminals of battery cells adjacent to each other may be electrically connected through a bus-bar. The bus-bar may be fixed to the positive and negative electrode terminals using a member such as a nut.

The plurality of battery cells may be aligned in one direction. One or more plates may be used to maintain the alignment state of the battery cells. The plates may be used to fix the plurality of the battery cells and may be variously modified according to the design of the battery module.

FIG. 3 illustrates a sectional view taken along line A-N of FIG. 1.

Referring to FIG. 3, the heat exchange member 30 may be provided on the outer bottom surface of the lower case 20. The flow path 31 through which the cooling medium moves may be formed in the upper surface 40 of the heat exchange member 30. The upper surface 40 of the heat exchange member 30 may be attached to the outer bottom surface of the lower case 20. The bottom surface of the lower case 20 may seal the flow path 31 formed in the heat exchange member 30, such that it may be possible to prevent the occurrence of leakage of the heat exchange medium moving through the flow path 31. Particularly, when the case configured described above is installed in a vehicle, the height of the case may be reduced by omitting a cover of the heat exchange member 30. Thus, the case may be installed even in a narrow space.

The heat exchange member 30 according to this embodiment may be formed in the shape of a plate having a predetermined thickness. The heat exchange member 30 may be used to control heat generated in the battery cell. The flow path 31 through which the heat exchange medium flows to exchange heat with the battery module, i.e., the battery cell, may be provided in the heat exchange member 30.

The heat exchange member 30 may be welded to the bottom surface of the lower case 20 through brazing. Each of the heat exchange member 30 and the lower case 20 may be manufactured through die-casting, thereby reducing an accumulated assembly tolerance that may be generated in the manufacturing of the case.

Brazing is a kind of soldering, and is a method of coupling base materials to each other without melting the base materials by penetrating a melted adhesive between the base materials. An adhesive having a melting point lower than that of the base material may be used as an adhesive for brazing. In addition, the die-casting is one of casting methods, and is a precision casting method of injecting a melted metal into a mold made of steel exactly machined to completely correspond to a required casting shape, thereby obtaining a casting equal to the mold. Accordingly, the bottom surface of the lower case 20 and the contact surface of the heat exchange member 30 may be adhered more closely to each other, and the contact surface between the bottom surface of the lower case 20 and the heat exchange member 30 may be increased, thereby improving the reliability and stability of the battery pack.

Figure 4A:
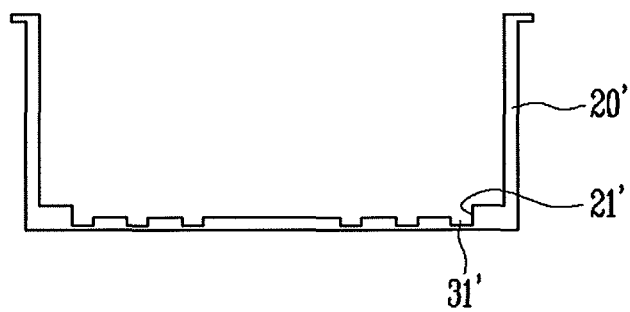
FIG. 4A illustrates a sectional view showing a case for a battery pack according to another embodiment.
Figure 4B:
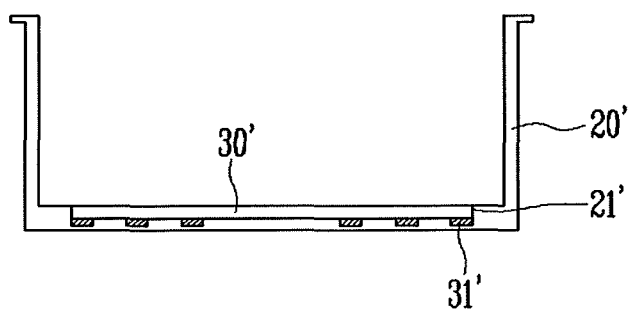
FIG. 4B illustrates a sectional view showing the case including a heat exchange member according to the embodiment illustrated in FIG. 4A.

FIG. 4A illustrates a sectional view showing a case for a battery pack according to another embodiment. FIG. 4B illustrates a sectional view showing the case including a heat exchange member according to the embodiment.

Referring to FIGS. 4A and 4B, in the case 20' according to this embodiment, a flow path 31' through which a cooling medium moves may be formed in an inner bottom surface of the case 20'. In addition, the inner bottom surface of the case 20' may include a recess 21' such that the a heat exchange member 30' may be received the inner bottom surface of the case 20'. The heat exchange member 30' may be formed in the shape of a plate to seal the flow path 31' formed in the inner bottom surface of the case 20'. It may be possible to prevent a heat exchange medium flowing through the flow path 31' from being leaked and then condensed inside the battery pack.

The flow path 31' may be formed in the inner bottom surface of the case 20', and the case 20' and the heat exchange member 30' may be welded through brazing such that the plate-shaped heat exchange member 30' seals the flow path 31'. As such, the case 20' and the heat exchange member 30' may be integrally formed.

In addition, a heat shield material such as air layer, paper, or rubber may be provided at a lower portion of the heat exchange member 30'.

According to some implementations, the case 20' may be a lower case that is used with the upper case 10 illustrated in FIGS. 1 and 2 to accommodate a battery pack.

By way of summation and review, a high-power and large-capacity battery pack generates a large amount of heat in a charging/discharging process thereof. To dissipate heat generated in the battery cells, a heat exchange member may be mounted in the high-power and high-capacity battery pack. Mounting a heat exchange member to a battery pack may increase manufacturing time and cost, and a mounted heat exchange member may take up space.

According to embodiments, one surface of a case may be substituted for a cover of the heat exchange member, so that the case and the heat exchange member may be integrally manufactured. Thus, it may be possible to omit a component, thereby reducing unit cost.

Further, the case and the heat exchange member may be welded to each other through brazing, so that a bolt fastening process may be omitted, thereby reducing manufacturing time and cost. In addition, it may be possible to reduce an accumulated assembly tolerance generated in the manufacturing of the case, thereby improving product accuracy.

Further, the contact area between the case and the heat exchange member may be increased, thereby improving the reliability and stability of the battery pack.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A case for a battery pack, the case comprising:
   a case member defining a space configured to accommodate a plurality of battery cells therein, the case member including a lower case and an upper case, the upper case fitting on the lower case to enclose the space to accommodate the plurality of battery cells, wherein:
   an inner bottom surface of the case member includes a seating groove and recesses, the recesses defining a flow path in the inner bottom surface of the case member, the flow path accommodating a cooling medium, the seating groove and the flow path being formed continuously with different depths from each other in a thickness direction from the inner bottom surface of the case member, and
   a heat exchange member is received in the seating groove and attached to the inner bottom surface of the case member, the inner bottom surface of the case member and the heat exchange member each being disposed to contact the cooling medium, the heat exchange member being in a form of a plate partially overlapping the inner bottom surface of the case member and attached to the inner bottom surface of the case member by a brazing seal located so as to seal the flow path such that leakage of the cooling medium from the flow path is prevented.

2. The case as claimed in claim 1, further including a heat shield material at an outer bottom surface of the case member.

3. The case as claimed in claim 1, wherein the case member and the heat exchange member are die-cast.

* * * * *